United States Patent
Bart et al.

(10) Patent No.: US 9,230,216 B2
(45) Date of Patent: Jan. 5, 2016

(54) SCALABLE SPATIOTEMPORAL CLUSTERING OF HETEROGENEOUS EVENTS

(71) Applicant: Palo Alto Research Center Incorporated, Palo Alto, CA (US)

(72) Inventors: Evgeniy Bart, Sunnyvale, CA (US); Robert R. Price, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 289 days.

(21) Appl. No.: 13/890,139

(22) Filed: May 8, 2013

(65) Prior Publication Data

US 2014/0337264 A1    Nov. 13, 2014

(51) Int. Cl.
G06F 17/00    (2006.01)
G06N 5/02    (2006.01)

(52) U.S. Cl.
CPC ..................... *G06N 5/022* (2013.01)

(58) Field of Classification Search
None
See application file for complete search history.

(56) References Cited

U.S. PATENT DOCUMENTS

2008/0114800 A1* 5/2008 Gazen et al. ............... 707/101
2011/0261049 A1* 10/2011 Cardno et al. .............. 345/419

OTHER PUBLICATIONS

Sun et al. "Relation Strength-Aware Clustering of Heterogeneous Information Networks with Incomplete Attributes", VLDB, 2012, pp. 394-405.*
Cheeseman et al. "AutoClass: A Bayesian Classification System", ML, 1988, pp. 54-64.*
Chen et al. "Collective Mining of Bayesian Networks from Distributed Heterogeneous Data", Knowledge and Information Systems, 2004, pp. 164-187.*

* cited by examiner

*Primary Examiner* — Li-Wu Chang
(74) *Attorney, Agent, or Firm* — Shun Yao; Park, Vaughan, Fleming & Dowler LLP

(57) ABSTRACT

One embodiment of the present invention provides a system for clustering heterogeneous events. During operation, the system finds a partition of events into clusters such that each cluster includes a set of events. In addition, the system estimates probability distributions for various properties of events associated with each cluster. The system obtains heterogeneous event data, and analyzes the heterogeneous event data to determine the distribution of event properties associated with clusters and to assign events to clusters.

18 Claims, 5 Drawing Sheets

SCALABLE SPATIOTEMPORAL CLUSTERING OF HETEROGENEOUS EVENTS

STATEMENT OF GOVERNMENT-FUNDED RESEARCH

This invention was made with Government support under Contract No. W911NF-11-C-0216 (3729) awarded by the Army Research Office. The Government has certain rights in this invention.

BACKGROUND

1. Field

This disclosure is generally related to analyzing heterogeneous events. More specifically, this disclosure is related to a method and system for analyzing a large set of event data by introducing a probability model to cluster heterogeneous events.

2. Related Art

For many applications, it is useful to analyze heterogeneous, information-rich events. Heterogeneous events are events that may vary by different factors, including event type, descriptors, location and time. For example, one type of heterogeneous event can be found in military applications. The military may monitor field operations that produces events such as meetings between people of interest, field reports filed by personnel, images and sounds recorded by equipment deployed in locations of interest, and improvised explosive device (IED) explosions.

Depending on context, analysts may classify events as shallow or deep. Shallow events are those for which relatively little information is available beyond event type, location, and time. Deep events are those for which a rich set of information is available, such as a long field report or a video sequence capturing the event.

Systems for analyzing event data may collect homogenous or heterogeneous event data. When events are homogenous, all events are of the same type (e.g., observing a pine tree of a particular species) and are characterized by the same set of descriptors (e.g. the girth, height, and age of the tree). Another example of a homogenous event is a "check-in" event where certain software applications may produce events when users check into a venue at a certain time and location.

When the events are heterogeneous, multiple event types are present (e.g. meetings, patrols, and IED explosions), and each event is characterized by a potentially different set of descriptors. For example, an IED detonation can be characterized by descriptors such as power and materials used. These descriptors are inapplicable to other events such as meetings between people, which is characterized by a different set of descriptors (e.g., the set of people involved and the meeting duration). Modeling heterogeneous events is particularly important when there are interactions between events (e.g. meetings between suspected terrorists may precede planting an IED).

Current approaches for analyzing events cannot scale to very large data sets. Furthermore, such approaches typically only deal with homogenous events where arguments are of the same type and described by the same set of descriptors. To process data sets containing heterogeneous events, one can split the heterogeneous events into several data sets, each restricted to a particular type of event. This approach, however, does not allow for modeling interactions between events.

Some researchers have proposed techniques for analyzing interactions between heterogeneous events. Such proposals typically involve manually constructing detectors for specific activities of interest. For example, some researchers have proposed detectors for intrusion detection. However, such manually constructed detectors may not be used for exploratory analysis. Furthermore, each new detection task requires manually developing a dedicated detector. This is a complex, time-consuming and error-prone procedure.

SUMMARY

One embodiment of the present invention provides a system for clustering heterogeneous events. During operation, the system finds a partition of events into clusters such that each cluster includes a set of events. In addition, the system estimates probability distributions for various properties of events associated with each cluster. The system obtains heterogeneous event data, and analyzes the heterogeneous event data to determine the distribution of event properties associated with clusters and to assign events to clusters.

In a variation on this embodiment, a respective event property is one of: event time, event location, event type, event description, event location properties, or event time properties.

In a further variation, the event location properties indicate whether the location is urban, rural, or near or far from a road.

In a further variation, the event time properties indicate whether the event time is day, night, weekend, or weekday.

In a variation on this embodiment, analyzing the heterogeneous event data to determine the distribution of event properties associated with clusters comprises determining the probability distributions using Spatio-Temporal latent Dirichlet allocation (ST-LDA).

In a variation on this embodiment, analyzing the heterogeneous event data to determine the distribution of event properties associated with clusters comprises using a joint probability distribution that factorizes as follows:

$$p(\theta \mid \alpha) \prod_{i=1}^{N} p(c_i \mid \theta) p(d_i^t \mid c_i, \phi_c^{dt}) p(d_i^l \mid c_i, \phi_c^{dl})$$

$$p(t_i \mid c_i, \phi_c^t) p(l_i \mid c_i, \phi_c^l) \times \times p(e_i \mid c_i, l_i, t_i, d_i^l, d_i^t, \phi_{c,l,t,d^l,d^t}^e)$$

$$\prod_{j=1}^{M_i} p(m_{ij} \mid c_i, e_i, l_i, t_i, d_i^l, d_i^t, \phi_{c,e,l,t,d^l,d^t}^m) \times$$

$$\prod_{c,e,l,t,d^l,d^t} p(\phi_{c,e,l,t,d^l,d^t}^m \mid \beta^m) \prod_{c,l,t,d^l,d^t} p(\phi_{c,l,t,d^l,d^t}^e \mid \beta^e).$$

In a variation on this embodiment, the system applies a Gibbs sampling or variational inference algorithm to determine the distribution of event properties associated with clusters and to assign events to clusters.

BRIEF DESCRIPTION OF THE FIGURES

In the figures, like reference numerals refer to the same figure elements.

DETAILED DESCRIPTION

Figure 1:
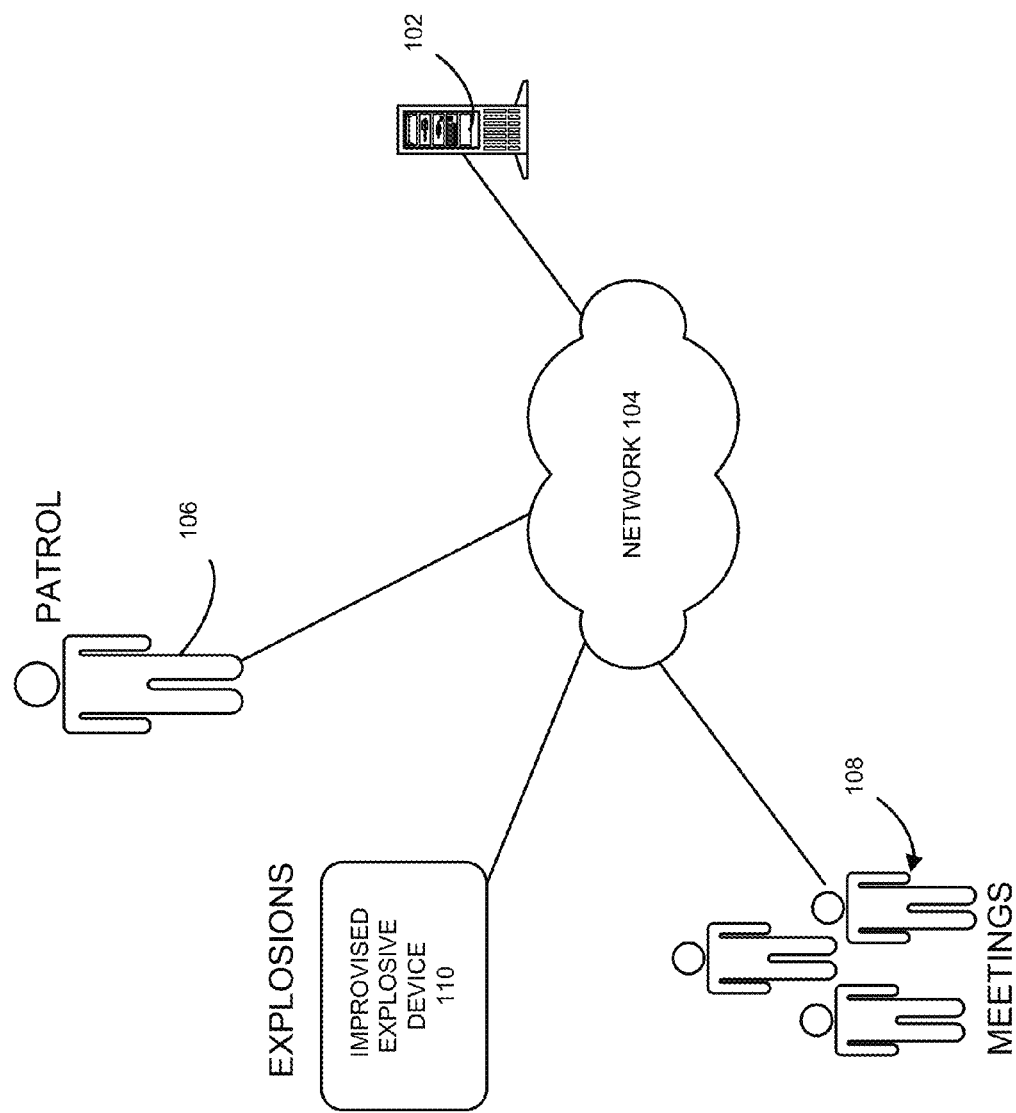
FIG. 1 presents a diagram illustrating a system for collecting and clustering event data, according to an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of analyzing heterogeneous information-rich events by clustering heterogeneous events using a novel probability model. The methods and probability model discussed herein facilitate scalable spatiotemporal clustering of heterogeneous events. One can model the spatial and temporal aspects of events with the disclosed probability model.

This probability model facilitates inferring the probability distributions of properties of heterogeneous events associated with clusters and distribution of events among a number of clusters. A cluster of heterogeneous events is a group of events which the model explains using the same probability distribution; such groups of events typically have property values that are likely under the probability distributions of the cluster. A property is, for example, the location or time of an event. By clustering events together, the system allows for detecting interactions between events. For example, one may detect that meetings between suspected terrorists may precede planting an improvised explosive device (IED)).

The methods described herein utilize standard multivariate probability inference techniques to infer a joint probability distribution. A system applying the methods described herein can obtain heterogeneous event data, and then use standard inference techniques with the disclosed probability model to determine the probability distributions of the cluster's properties, and the distribution of events among clusters. The disclosed probability model is a generative model, and belongs to the general family of topic models.

Note that one can perform a generative process associated with the disclosed model by sampling a cluster, and then sampling an event from the cluster. First, one samples a cluster with an associated index. The clusters correspond to events that co-occur often. Each cluster has a set of parameters $\phi_t$ that determine the events that may occur in the cluster, and the properties of these events. For example, a cluster may correspond to "normal activity," and involves event of type "patrol" and mostly uneventful field reports. Another cluster may correspond to "terrorist activity." This cluster may include events such as "meetings" (particularly involving suspected terrorists), as well as TED explosions. Different terrorist cells may correspond to different clusters if they differ, for example, in the typical TED types or materials they use.

After sampling the cluster, one can sample an event from the parameters associated with the cluster. For each event, one can sample the event type, as well as parameters such as location, time, properties of the location (for example "urban area" or "rural area") and the properties of the time (for example, "weekday" or "religious holiday"), and other metadata.

Note that a computing system may utilize the disclosed probability model a parallel architecture, thereby facilitating analysis of massive data sets.

System Architecture

FIG. 1 presents a diagram illustrating a system for collecting and clustering event data, according to an embodiment. In FIG. 1, a server 102 receives event data over a network 104. Various computers and/or other electronic equipment may collect data describing events such as a soldier on patrol 106, terrorists holding a meeting 108, and an explosion from an improvised explosive device 110.

After receiving the event data, server 102 may cluster the heterogeneous events. This involves determining probability distributions for properties of events in clusters, and also determining distribution of events among clusters. As the system receives events, the system computes probability distributions that converge toward the true distributions associated with the events, or to an appropriate approximation or a bound thereof.

After the system determines the distributions and cluster assignments, they may be utilized to analyze event patterns. The system and/or a human operator may utilize the inferred probability distributions to generate fictional events to predict future events. The system and/or a human operator may also utilize the probability distributions to determine whether two events are caused by the same factor, co-occur often, and to detect outlier events, erroneous observations, and deliberately deceptive observations.

In one example, the system may compute a probability (e.g. $p(c_i=c_j)$) to determine whether two events i and j arise from the same cluster to determine whether they are caused by the same factor. The system may also detect outliers or anomalies by finding events with unusually low probabilities under the model. As another example, one can determine the cluster indices that are associated with events occurring at a given location. One can sample additional events from parameters associated with those clusters to predict future events that may occur at those locations.

Figure 2:
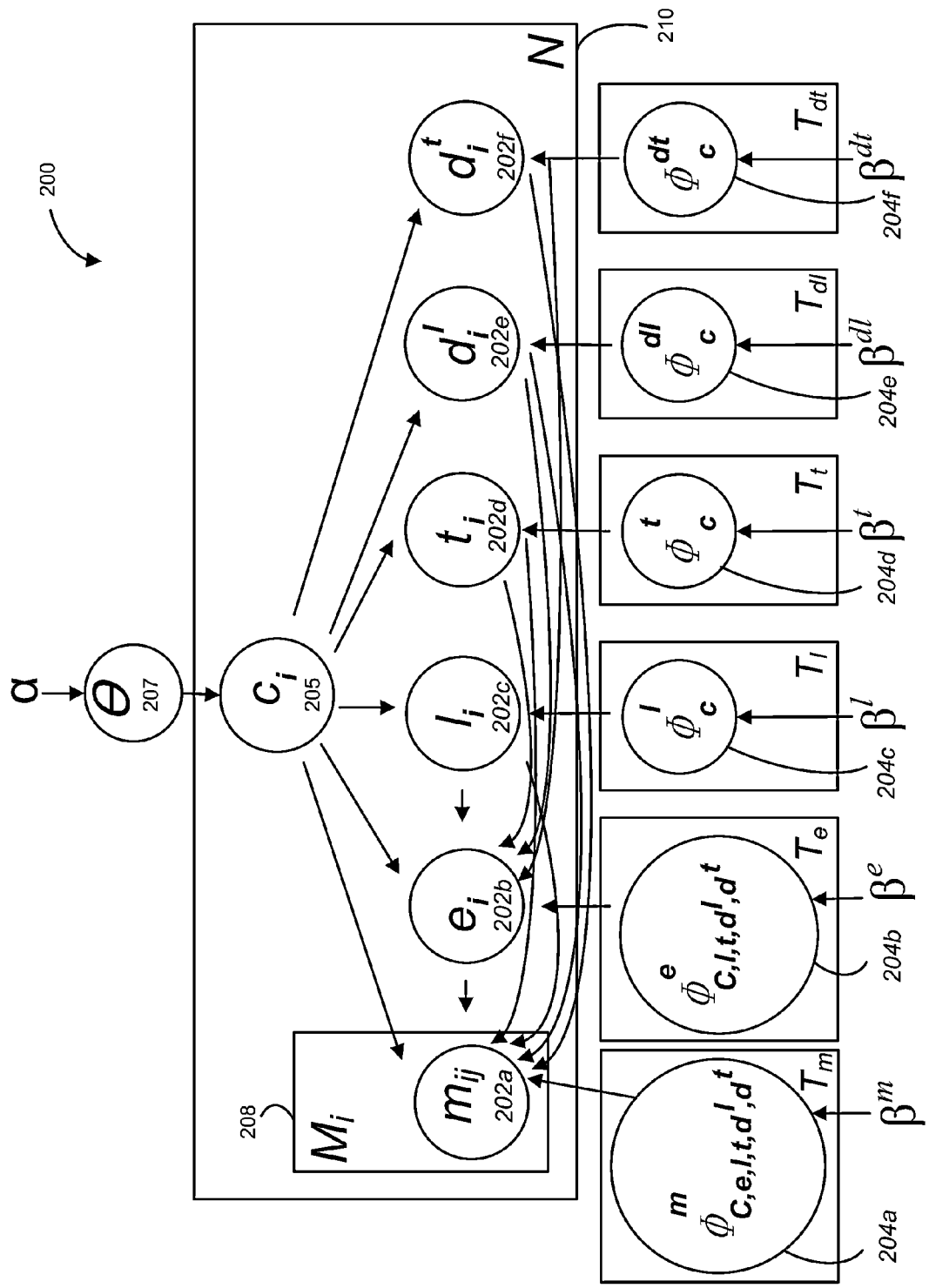
FIG. 2 presents a block diagram illustrating an exemplary probability model for clustering heterogeneous events, according to an embodiment.

FIG. 2 presents a block diagram illustrating an exemplary probability model for clustering heterogeneous events, according to an embodiment. The probability model 200 of FIG. 2 is illustrated using plate notation. Plate notation is a method of representing variables that repeat in a graphical model. A plate is drawn as a rectangle. Each plate groups variables that repeat together into a subgraph, and a number (e.g., N, T, $M_i$) is shown on the plate to represent the number of repetitions of the subgraph in the plate.

The probability model depicted in FIG. 2 illustrates dependency structures between different properties (also called variables) of clusters. Arrows represent dependencies in the diagram. The arrows denote the dependency structure of the probabilistic model. Note that the illustrated model is a generalized version, and one can remove or add dependencies to adapt the model to suit different applications.

In FIG. 2, properties are represented as nodes (e.g., circles). Each node corresponds to a variable in the probabilistic model. Nodes 202a-202f are variables representing properties of observed events. The system receives actual events with properties represented by nodes 202a-202f. Then, based on the properties of the events received, the system determines the probability distributions of the latent variables represented by nodes 204a-204f. The system can determine the joint probability distribution p(θ, $c_i$, $e_i$, $l_i$, $t_i$, φ) for every combination of variable values. Similar to the dependencies, one can change or remove the nodes to adapt to different applications. The other symbols illustrated in FIG. 2 are defined and explained below.

In FIG. 2, α is a hyperparameter. In Bayesian statistics, a hyperparameter is a parameter of a prior distribution. A prior distribution is a probability distribution that expresses one's uncertainty about a parameter or latent variable of a distribution. The prior distribution can be a subjective assessment of an expert, or derived empirically from the data, or can be chosen as non-informative. In this diagram, α represents a parameter of a prior distribution θ, shown as node θ 207.

Node θ 207 represents a prior distribution of the events among the clusters. Node θ 207 represents an estimate of the distribution of events among the clusters prior to observing any actual events (e.g., node θ 207 may be estimated from previous experience). The system determines the prior distribution for node θ 207 based on α. For example, the distribution of events may be 20%, 20%, and 60% among three clusters.

FIG. 2 also depicts a plate 210 representing N events, each event i associated with six types of random variables and a cluster value $c_i$. The system infers the value of node $c_i$ 205, which indicates a cluster that event i belongs to. There are T clusters, and the graph indicates that there are six probability distributions associated with each cluster.

$β^m$, $β^e$, $β^l$, $β^t$, $β^{dl}$, and $β^{dt}$ are hyperparameters of the corresponding prior distributions. For example, $β^m$ represents the hyperparameter for descriptive information associated with an event. $β^e$ represents the hyperparameter for the event type property. Usually, the same value of the hyperparameter is used for all clusters c represented by plate $T_e$. Similarly, $β^l$ represents the hyperparameters for the location property in a cluster c. $β^t$ represents the hyperparameters for the time property in a cluster c. $β^{dl}$ represents the hyperparameters of properties associated with locations. Properties associated with locations may include whether the location is urban, rural, or near or far from the road. $β^{dt}$ represents the hyperparameters of properties associated with time. Properties associated with time may include whether the time is day, night, weekend, or weekday.

The system estimates the posterior property probabilities based on data describing observed events. Nodes $m_{ij}$, $e_i$, $l_i$, $t_i$, $d_i^l$, and $d_i^t$ represent properties of actual events that the system observes. Node $m_{ij}$ is located in a descriptive information plate 208 labeled with $M_i$, and $m_{ij}$ represents the descriptive information in a report, an image, video, and/or audio recording. $M_i$ represents repetition over the number of words associated with the descriptive information of event i. Node $e_i$ represents the event type. Node $l_i$ represents the location of an event i. Node $t_i$ represents the time at which the event i occurred. Node $d_i^l$ represents a property (e.g., urban, rural, or near or far from the road) associated with a location for event i. Node $d_i^t$ represents a property (e.g., day, night, weekend, or weekday) associated with a time for event i.

The φ nodes represent probability distributions for the properties of events in clusters. The φ nodes are located in plates labeled $T_m$, $T_e$, $T_l$, $T_t$, $T_{dl}$, and $T_{dt}$. $T_m$ is the number of clusters for the $m_{ij}$ property. The appropriate number of clusters for $m_{ij}$ is determined by the dependency structure of the model. In one embodiment (illustrated in FIG. 2), $m_{ij}$ depends on $e_i$, $l_i$, $t_i$, $d_i^l$, and $d_i^t$. If $e_i$ can take E values, $l_i$ can have L values, etc., then the number of clusters for $m_{ij}$ is $T_m = T \times E \times L \times T \times D^l \times D^t$. If some of the dependencies are removed, the appropriate number of clusters reduces accordingly. Similarly, $T_e$ is the number of clusters for the event type property, $T_l$ is the number of clusters for the location property, $T_t$ is the number of clusters for the time property, $T_{dl}$ is the number of clusters for the properties associated with locations, and $T_{dt}$ is the number of clusters for the properties associated with time.

Node $\phi_{c,e,l,t,dl,dt}^m$ represents a probability distribution over descriptive information associated with an event. For example, $m_{ij}$ may represent the $j_{th}$ word in the report, or j'th image patch in an image. The variable $m_{ij}$ is sampled from a probability distribution with parameters $\phi_{c,e,l,t,dl,dt}^m$, where c is $c_i$, the cluster index for event i, e is $e_i$, the event type, l is $l_i$, the location, and so on. For text reports, the probability distribution may be categorical (multinomial). For images, the appropriate distribution may also be a multinomial, or, alternatively, normal (Gaussian), according to the type of image information modeled.

Node $\phi_{c,l,t,dl,dt}^e$ represents a probability distribution over the type of events. In some embodiments, this is a categorical distribution since the events belong to separate categories. Examples of event categories include field report, patrol report, and terrorist attack. In other cases, this may be a distribution over a hierarchical structure, to incorporate the possibility that some event types are different but related. For example, event types "patrol report" and "witness report" are different, but have more in common than event types "patrol report" and "IED explosion."

Node $\phi_c^l$ represents the probability distribution over the location property of events in cluster c. The probability distribution is over a two dimensional data set of x, y coordinates. The subscript $\phi_c^l$ refers to a cluster index. In one embodiment, this is a normal distribution, and $\phi_c^l$ represents the mean and covariance. In this case, $β^l$ represents the parameters of an appropriate prior distribution. In one embodiment, this is a conjugate probability distribution such as a Normal-Inverse-Wishart distribution with parameters $β^l = (μ_0, κ_0, ν_0, Λ_0)$.

Node $\phi_c^t$ represents the probability distribution over the time property of events in cluster c. This probability distribution is one-dimensional and continuous.

Node $\phi_c^{dl}$ represents the distribution of location properties. Such properties of locations include whether the location is urban, rural, or near or far from the road. In one embodiment, this is a categorical (multinomial) distribution.

Node $\phi_c^{dt}$ represents the probability distribution of time properties. Such time properties include whether the time is day, night, weekend, or weekday. In one embodiment, this is a categorical (multinomial) distribution.

Note that in one embodiment, the system may analyze heterogeneous event data to determine the distribution of event properties associated with clusters using a joint probability distribution that factorizes as follows:

$$p(\theta \mid \alpha) \prod_{i=1}^{N} p(c_i \mid \theta) p(d_i^t \mid c_i, \phi_c^{dt}) p(d_i^l \mid c_i, \phi_c^{dl})$$

$$p(t_i \mid c_i, \phi_c^t) p(l_i \mid c_i, \phi_c^l) \times \times p(e_i \mid c_i, l_i, t_i, d_i^l, d_i^t, \phi_{c,l,t,d^l,d^t}^e)$$

$$\prod_{j=1}^{M_i} p(m_{ij} \mid c_i, e_i, l_i, t_i, d_i^l, d_i^t, \phi_{c,e,l,t,d^l,d^t}^m) \times$$

-continued $$\prod_{c,e,l,t,d^l,d^t} p(\phi^m_{c,e,l,t,d^l,d^t} | \beta^m) \prod_{c,l,t,d^l,d^t} p(\phi^e_{c,l,t,d^l,d^t} | \beta^e).$$

Exemplary Process

Figure 3:
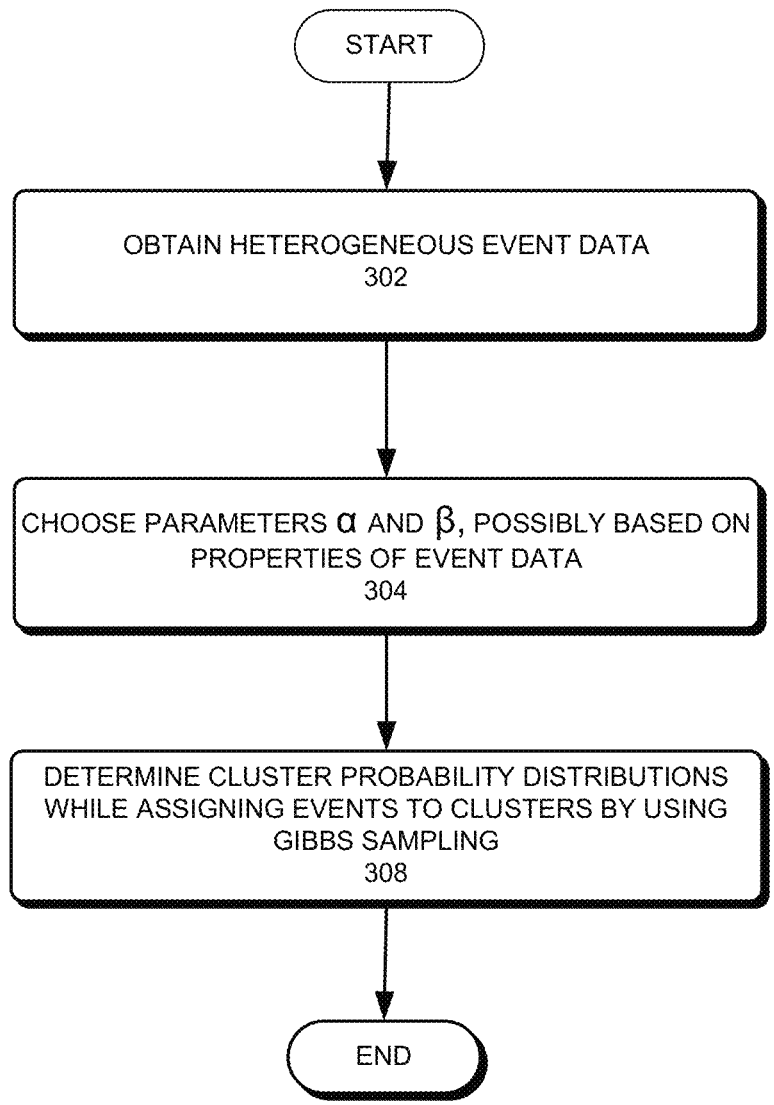
FIG. 3 presents a flowchart illustrating an exemplary process for determining cluster probability distributions and assigning events to clusters, according to an embodiment.

FIG. 3 presents a flowchart illustrating an exemplary process for determining cluster probability distributions and assigning events to clusters, according to an embodiment. During operation, the system initially obtains heterogeneous event data (operation 302). The system may itself collect the event data or obtain the event data from computers with log records or from any machine or person that monitors and collect data on such events. A computer operator may input the event data or the computers may automatically collect such event data. Next, the system chooses parameters α and β, possibly based on properties of the event data (operation 304). The system may obtain both parameters through input from a human operator. The system may also obtain parameters from previously stored data or by generating the parameters. The system then determines cluster probability distributions while simultaneously assigning events to clusters by using Gibbs sampling (operation 306). Note that the system may also use other techniques besides Gibbs sampling. The system outputs a cluster for each event and the probability distribution for properties of events for each cluster.

To determine cluster probability distributions and assign events to clusters, the system may apply one of the standard inference techniques tier graphical models. These techniques include Gibbs sampling and variational inference. Gibbs sampling is a standard method for probabilistic inference. Gibbs sampling is a Markov chain Monte Carlo (MCMC) algorithm for obtaining a sequence of event observations from a multivariate probability distribution from the joint probability distribution of two or more variables). The system may utilize this sequence to approximate the joint, conditional, or marginal distributions of interest. Of particular interest are distributed versions of Gibbs sampling, because they allow to speed up inference when multiple processors are available, and can deal with situations where the available data is too big to fit on one machine. Such distributed versions have become available for topic models such as ST-LDA, but not for models previously used for spatiotemporal clustering. With variational inference, the system approximates the posterior distribution over a set of unobserved variables given some data (e.g., approximating the property and event distributions after observing the event evidence).

Note that embodiments of the present invention are not limited to utilizing Gibbs sampling or variational inference, and the system may also utilize other algorithms for inference.

After determining the probability distributions of the clusters, the system may gauge the accuracy of the probability model. The system can generate instances of events from the inferred probabilities, and compare the generated events to the actual events to determine whether the model is accurate.

Exemplary System Analyzing Heterogeneous Events

Figure 4:
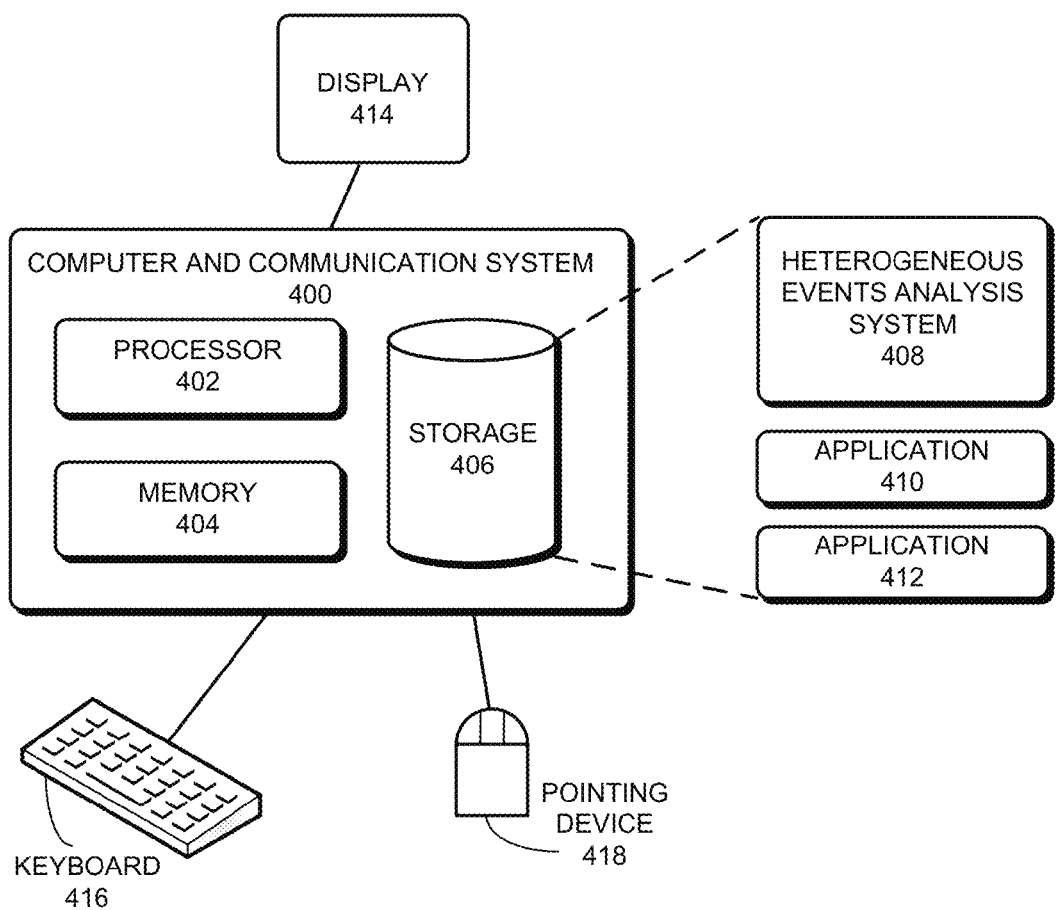
FIG. 4 illustrates a computer and communication system for analyzing heterogeneous events, in accordance with one embodiment of the present invention.
Figure 5:
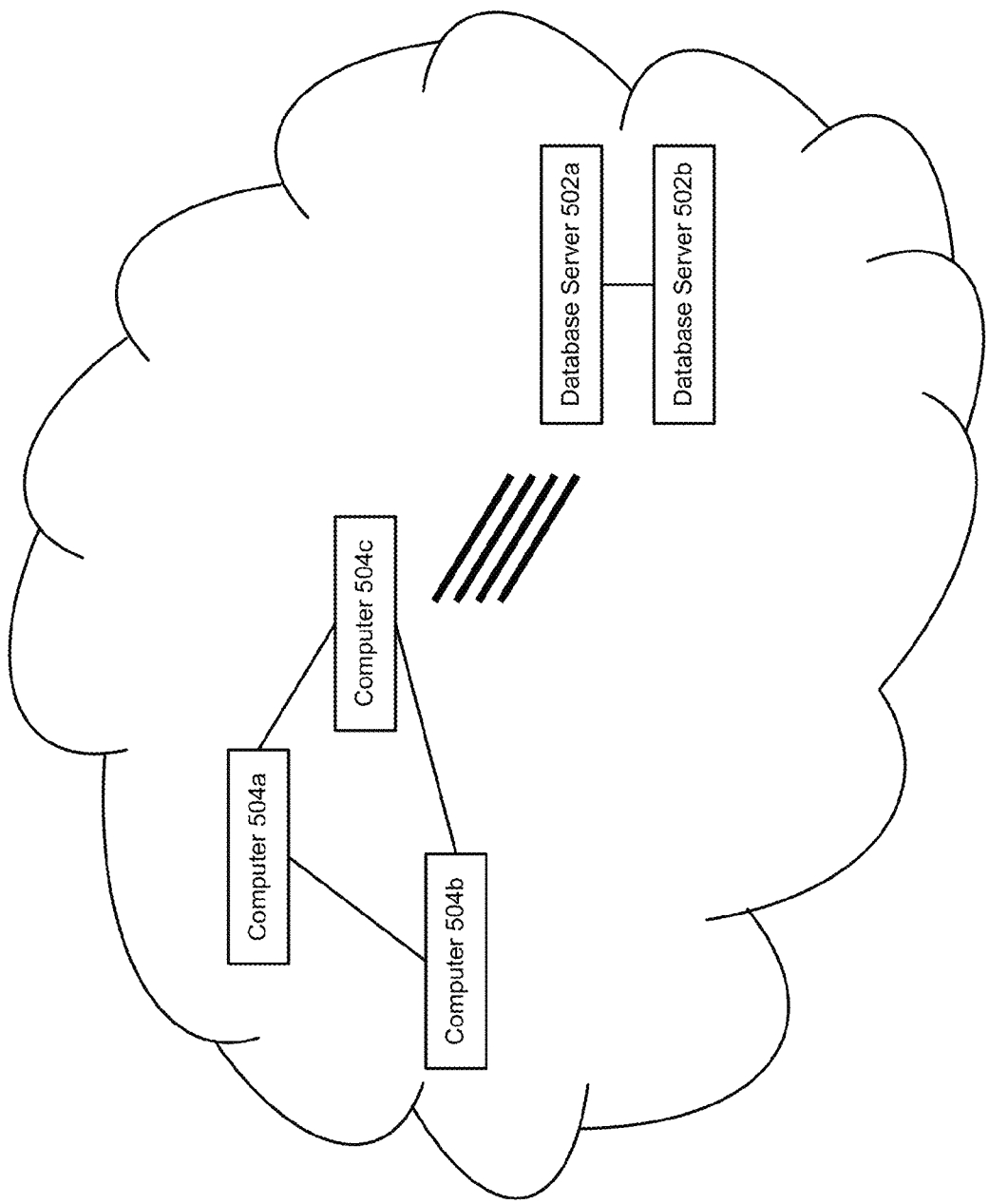
FIG. 5 illustrates an exemplary system for analyzing heterogeneous events, in accordance with one embodiment of the present invention.

FIG. 5 illustrates an exemplary system for analyzing heterogeneous events, in accordance with one embodiment of the present invention. In one embodiment, a number of computers that include communication systems are connected in a network, sometimes called "cloud" or "cluster." Some computers function as database servers 502a, 502b and provide access to a set of collected heterogeneous events. Other computers 504a, 504b, 504c implement a distributed version of Gibbs sampling for the purpose of performing inference over this dataset. Each computer is structured as shown in FIG. 4.

In FIG. 4, a computer and communication system 400 includes a processor 402, a memory 404, and a storage device 406. Storage device 406 stores a number of applications, such as applications 410 and 412. Storage device 406 also stores a heterogeneous events analysis system 408. During operation, one or more applications, such as heterogeneous events analysis system 408, are loaded from storage device 406 into memory 404 and then executed by processor 402. While executing the program, processor 402 performs the aforementioned functions. In the course of program execution, communication between various computers takes place. Compute servers (e.g., computers 504a, 504b, 504c) communicate with database servers 502a, 502b to obtain heterogeneous event data stored in database servers 502a, 502b. Compute servers also communicate with other compute servers as appropriate in order to implement the distributed Gibbs sampling algorithm. Each computer and communication system 400 is coupled to an optional display 414, keyboard 416, and pointing device 418.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method, comprising:
   determining a prior distribution of a cluster index variable for event assignments, wherein the prior distribution includes a hyperparameter that describes the mean and variance for the cluster index variable;
   determining a property-specific prior distribution for a respective event property, wherein the property-specific prior distribution includes a property-specific hyperparameter that describes the mean and variance for the respective event property;

obtaining heterogeneous event data that corresponds to two or more heterogeneous event types;

generating, based on the property-specific prior distribution for the respective event property and the property-specific hyperparameter, event property clusters for a respective event property of a plurality of event properties, wherein the respective event property is probabilistically dependent on the cluster index variable;

generating two or more different event type clusters for the heterogeneous event types, wherein a respective event type cluster is associated with a plurality of event property clusters, a respective event has an event type, an event type is an event property, and the respective event is represented by one or more event properties; and assigning events from the heterogeneous event data to the two or more different event type clusters and the event property clusters.

2. The method of claim 1, wherein a respective event property is one of: event time, event location, event type, event description, event location properties, or event time properties.

3. The method of claim 2, wherein the event location properties indicate whether the location is urban, rural, or near or far from a road.

4. The method of claim 2, wherein the event time properties indicate whether the event time is day, night, weekend, or weekday.

5. The method of claim 1, further comprising:
analyzing the heterogeneous event data to determine the distribution of event properties associated with clusters using a joint probability distribution that factorizes as follows:

$$p(\theta \mid \alpha) \prod_{i=1}^{N} p(c_i \mid \theta) p(d_i^t \mid c_i, \phi_c^{dt}) p(d_i^l \mid c_i, \phi_c^{dl})$$

$$p(t_i \mid c_i, \phi_c^t) p(l_i \mid c_i, \phi_c^l) \times p(e_i \mid c_i, l_i, t_i, d_i^l, d_i^t, \phi_{c,l,t,d^l,d^t}^e)$$

$$\prod_{j=1}^{M_i} p(m_{ij} \mid c_i, e_i, l_i, t_i, d_i^l, d_i^t, \phi_{c,e,l,t,d^l,d^t}^m) \times$$

$$\prod_{c,e,l,t,d^l,d^t} p(\phi_{c,e,l,t,d^l,d^t}^m \mid \beta^m) \prod_{c,l,t,d^l,d^t} p(\phi_{c,l,t,d^l,d^t}^e \mid \beta^e).$$

6. The method of claim 1, further comprising applying a Gibbs sampling or variational inference algorithm to determine the distribution of event properties associated with clusters and to assign events to clusters.

7. A non-transitory computer-readable storage medium storing instructions that when executed by a computer cause the computer to perform a method, the method comprising:

determining a prior distribution of a cluster index variable for event assignments, wherein the prior distribution includes a hyperparameter that describes the mean and variance for the cluster index variable;

determining a property-specific prior distribution for a respective event property, wherein the property-specific prior distribution includes a property-specific hyperparameter that describes the mean and variance for the respective event property;

obtaining heterogeneous event data that corresponds to two or more heterogeneous event types;

generating, based on the property-specific prior distribution for the respective event property and the property-specific hyperparameter, event property clusters for a respective event property of a plurality of event properties, wherein the respective event property is probabilistically dependent on the cluster index variable;

generating two or more different event type clusters for the heterogeneous event types, wherein a respective event type cluster is associated with a plurality of event property clusters, a respective event has an event type, an event type is an event property, and the respective event is represented by one or more event properties; and assigning events from the heterogeneous event data to the two or more different event type clusters and the event property clusters.

8. The non-transitory computer-readable storage medium of claim 7, wherein a respective event property is one of: event time, event location, event type, event description, event location properties, or event time properties.

9. The non-transitory computer-readable storage medium of claim 8, wherein the event location properties indicate whether the location is urban, rural, or near or far from a road.

10. The non-transitory computer-readable storage medium of claim 8, wherein the event time properties indicate whether the event time is day, night, weekend, or weekday.

11. The non-transitory computer-readable storage medium of claim 7, wherein the computer-readable storage medium stores additional instructions that, when executed, cause the computer to perform additional steps comprising:
analyzing the heterogeneous event data to determine the distribution of event properties associated with clusters using a joint probability distribution that factorizes as follows:

$$p(\theta \mid \alpha) \prod_{i=1}^{N} p(c_i \mid \theta) p(d_i^t \mid c_i, \phi_c^{dt}) p(d_i^l \mid c_i, \phi_c^{dl})$$

$$p(t_i \mid c_i, \phi_c^t) p(l_i \mid c_i, \phi_c^l) \times \times p(e_i \mid c_i, l_i, t_i, d_i^l, d_i^t, \phi_{c,l,t,d^l,d^t}^e)$$

$$\prod_{j=1}^{M_i} p(m_{ij} \mid c_i, e_i, l_i, t_i, d_i^l, d_i^t, \phi_{c,e,l,t,d^l,d^t}^m) \times$$

$$\prod_{c,e,l,t,d^l,d^t} p(\phi_{c,e,l,t,d^l,d^t}^m \mid \beta^m) \prod_{c,l,t,d^l,d^t} p(\phi_{c,l,t,d^l,d^t}^e \mid \beta^e).$$

12. The non-transitory computer-readable storage medium of claim 7, wherein the computer-readable storage medium stores additional instructions that, when executed, cause the computer to perform additional steps comprising applying a Gibbs sampling or variational inference algorithm to determine the distribution of event properties associated with clusters and to assign events to clusters.

13. A computing system for performing a method, the system comprising:
one or more processors,
a non-transitory computer-readable medium coupled to the one or more processors having instructions stored thereon that, when executed by the one or more processors, cause the one or more processors to perform operations comprising:
determining a prior distribution of a cluster index variable for event assignments, wherein the prior distribution includes a hyperparameter that describes the mean and variance for the cluster index variable;

determining a property-specific prior distribution for a respective event property, wherein the property-specific prior distribution includes a property-specific hyperparameter that describes the mean and variance for the respective event property;

obtaining heterogeneous event data that corresponds to two or more heterogeneous event types;

generating, based on the property-specific prior distribution for the respective event property and the property-specific hyperparameter, event property clusters for a respective event property of a plurality of event properties, wherein the respective event property is probabilistically dependent on the cluster index variable;

generating two or more different event type clusters for the heterogeneous event types, wherein a respective event type cluster is associated with a plurality of event property clusters, a respective event has an event type, an event type is an event property, and the respective event is represented by one or more event properties; and assigning events from the heterogeneous event data to the two or more different event type clusters and the event property clusters.

14. The system of claim 13, wherein a respective event property is one of: event time, event location, event type, event description, event location properties, or event time properties.

15. The system of claim 14, wherein the event location properties indicate whether the location is urban, rural, or near or far from a road.

16. The system of claim 14, wherein the event time properties indicate whether the event time is day, night, weekend, or weekday.

17. The system of claim 13, wherein the non-transitory computer-readable storage medium stores additional instructions that, when executed, cause the computer to perform additional steps comprising:

analyzing the heterogeneous event data to determine the distribution of event properties associated with clusters using a joint probability distribution that factorizes as follows:

$$p(\theta \mid \alpha) \prod_{i=1}^{N} p(c_i \mid \theta) p(d_i^t \mid c_i, \phi_c^{d_t}) p(d_i^l \mid c_i, \phi_c^{dl})$$

$$p(t_i \mid c_i, \phi_c^t) p(l_i \mid c_i, \phi_c^l) \times \times p(e_i \mid c_i, l_i, t_i, d_i^l, d_i^t, \phi_{c,l,t,d^l,d^t}^e)$$

$$\prod_{j=1}^{M_i} p(m_{ij} \mid c_i, e_i, l_i, t_i, d_i^l, d_i^t, \phi_{c,e,l,t,d^l,d^t}^m) \times$$

$$\prod_{c,e,l,t,d^l,d^t} p(\phi_{c,e,l,t,d^l,d^t}^m \mid \beta^m) \prod_{c,l,t,d^l,d^t} p(\phi_{c,l,t,d^l,d^t}^e \mid \beta^e).$$

18. The system of claim 13, wherein the non-transitory computer-readable storage medium stores additional instructions that, when executed, cause the computer to perform additional steps comprising:

applying a Gibbs sampling or variational inference algorithm to determine the distribution of event properties associated with clusters and to assign events to clusters.

* * * * *